UNITED STATES PATENT OFFICE.

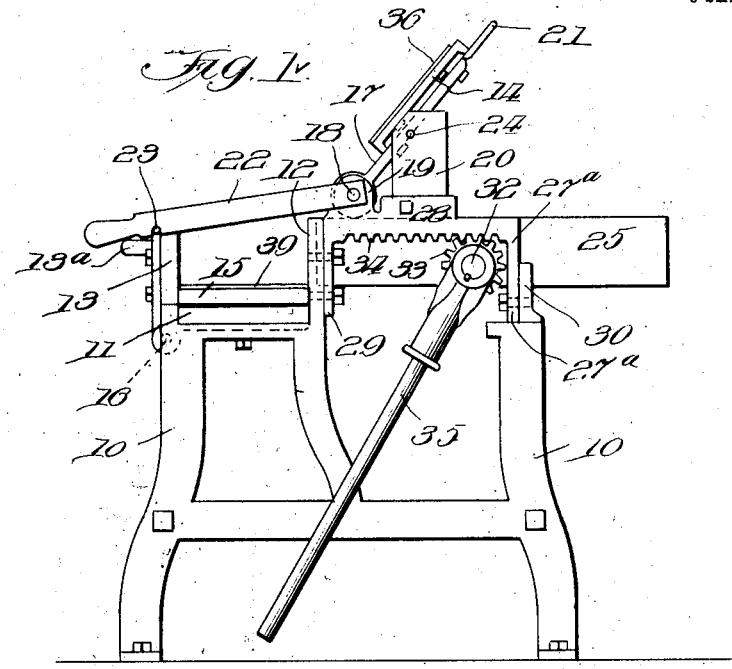

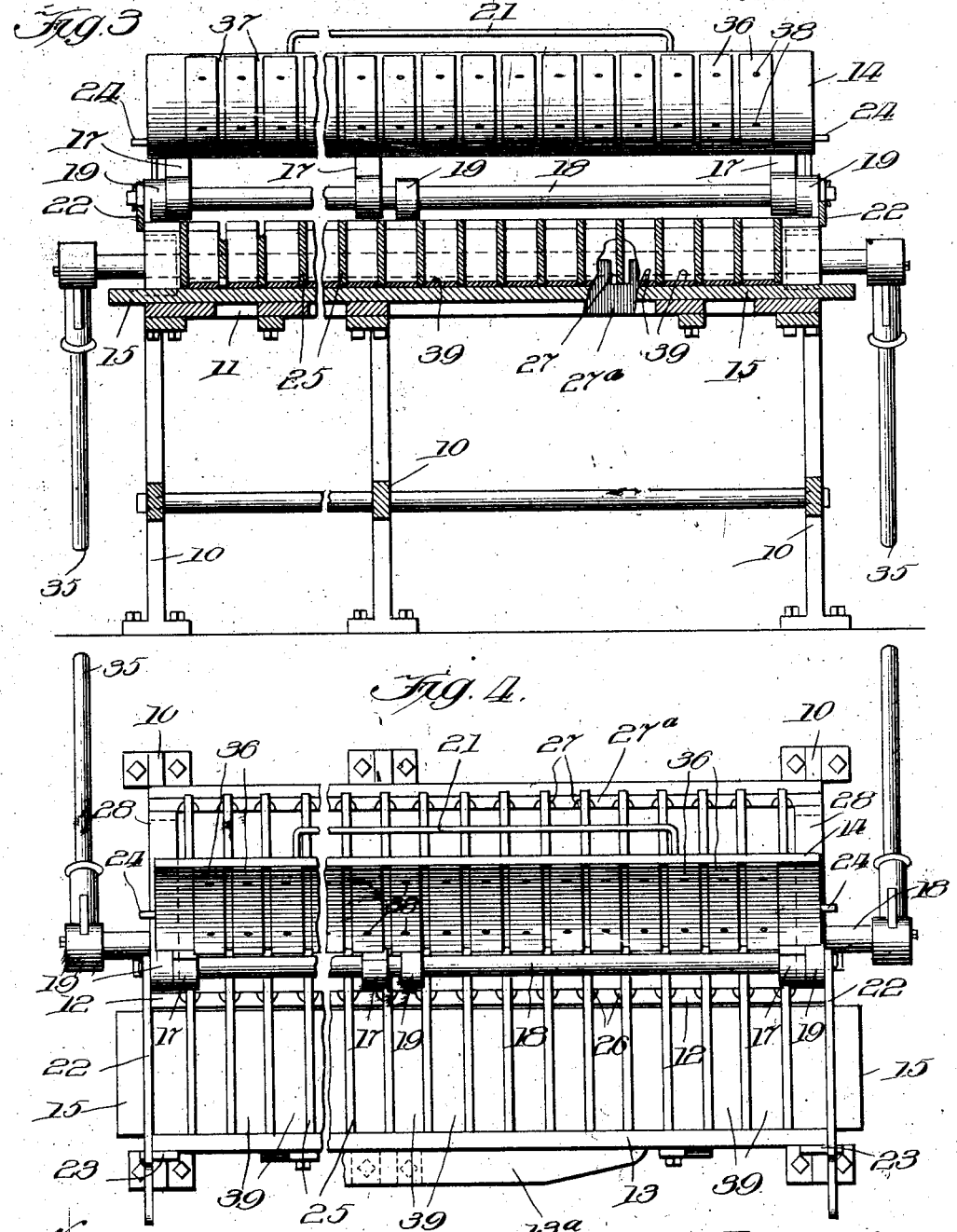

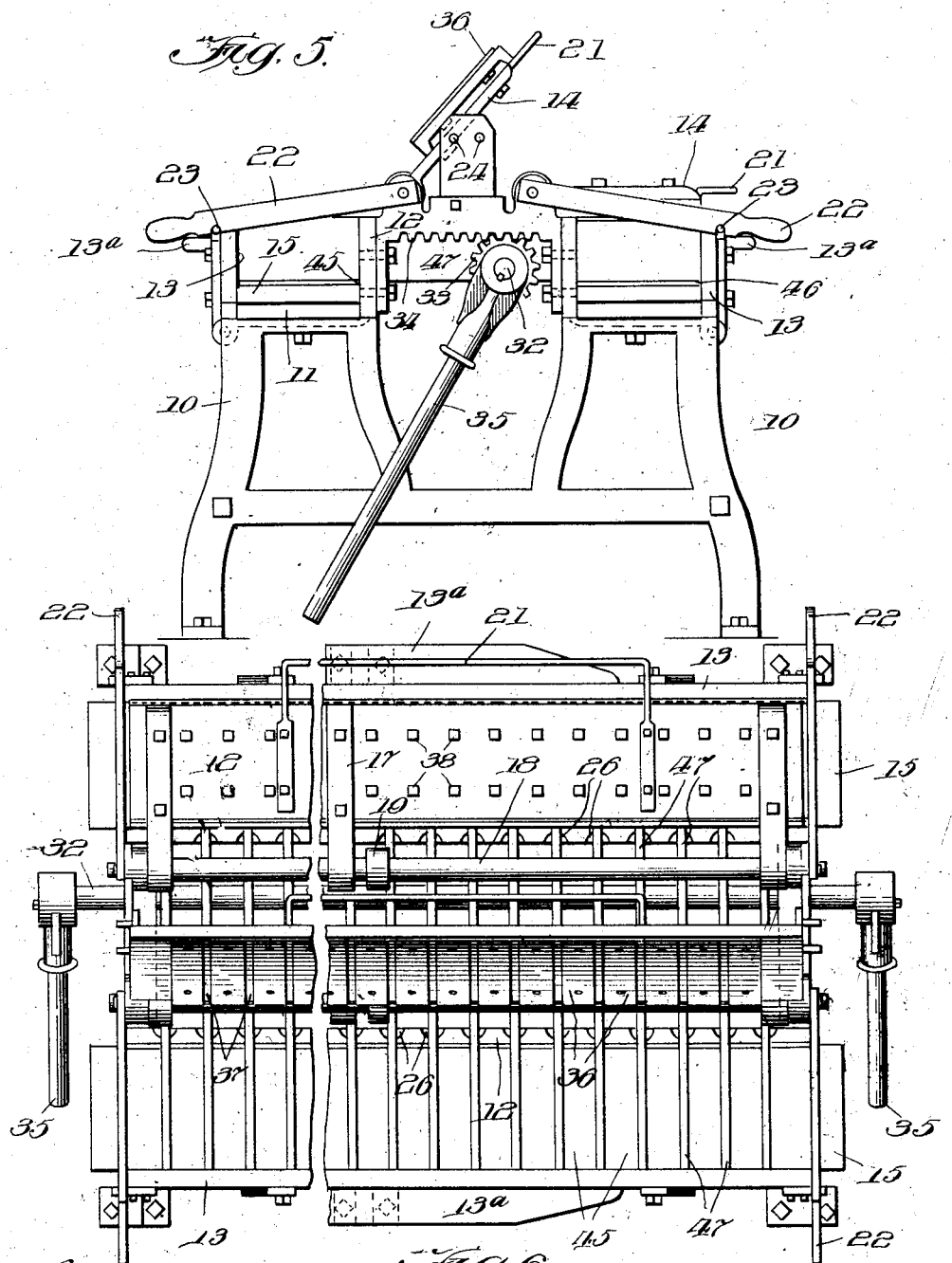

GEORGE BROWN, OF NILES, MICHIGAN, ASSIGNOR TO SOUTH BEND MACHINE MFG. CO., OF SOUTH BEND, INDIANA, A CORPORATION OF INDIANA.

MOLDING-MACHINE FOR FORMING BRICKS AND THE LIKE FROM PLASTIC MATERIAL.

No. 833,952.　　　　Specification of Letters Patent.　　　Patented Oct. 23, 1906.

Application filed January 11, 1906. Serial No. 295,649.

*To all whom it may concern:*

Be it known that I, GEORGE BROWN, a citizen of the United States, and a resident of the city of Niles, in the county of Berrien and State of Michigan, have invented certain new and useful Improvements in Molding-Machines for Forming Bricks and the Like from Plastic Material; and I do hereby declare that the following is a full, clear, and exact description thereof, reference being had to the accompanying drawings, and to the figures of reference marked thereon, which form part of this specification.

This invention relates to improvements in machines for molding bricks, blocks, and the like from plastic material such as cement, concrete, and the like; and the invention consists in the matters hereinafter set forth, and more particularly pointed out in the appended claims.

Among the objects of my invention is to provide an exceedingly simple, strong, and durable machine for the purpose set forth which may be economically constructed and operated at a large capacity with a minimum expenditure of labor.

The invention has for its objects other improvements in machines of the class specified, which will hereinafter be described, and fully pointed out in the claims appended hereto.

The molding-machine herein shown as embodying my invention is generally like the machine illustrated in my pending application for Letters Patent of the United States, Serial No. 259,976, filed on the 11th day of May, 1905, and embraces a suitable mold having movable or swinging walls whereby access may be had to the mold-chamber for the purpose of introducing thereinto the plastic material and for removing the molded forms after the forms have set, said parts operating in connection with partition-plates which are movable into and out of the mold-chamber and which coact with the walls of the mold and the mold-bed to constitute the mold-spaces in which the bricks or blocks are separately molded.

My present invention is characterized by certain novel features of construction designed to improve the construction and operation of the machine and to facilitate the manufacture of the molded articles, both with respect to facility of operation of the machine and the character of the articles formed.

In the drawings, Figure 1 is an end view of a molding-machine embodying my invention, showing the cover swung upwardly. Fig. 2 is a transverse vertical section thereof, showing the cover in its closed position. Fig. 3 is a longitudinal vertical section broken away. Fig. 4 is a plan view of the machine with parts broken away, showing the cover elevated. Fig. 5 is an end view of a modified form of the machine. Fig. 6 is a top plan view, partially broken away, of the form shown in Fig. 5.

First referring to Figs. 1 to 4 of the drawings, 10 designates the frame of the machine, which may be made of any suitable form and supports at one side thereof a mold, consisting of a bottom wall or plate 11, side walls 12 and 13, and a top wall 14. The mold-bed, upon which the molded articles are formed, consists, preferably, of a removable pallet-board 15, which is supported horizontally upon the bottom plate 11 between the side walls 12 and 13.

The removability of the pallet-board enables the molded forms to be removed from the mold on the same support on which they are formed, so that the said molded forms or articles may be dried without removing them from the board. In practice a number of said pallet-boards are provided with one machine, so that the operation of molding may be carried on practically continuously. The side wall 12 is shown as fixed, it being made integral with said frame. The opposite side wall 13 is mounted so as to be capable of being lowered below the level of the pallet 15, whereby the pallet-board and the molded articles thereon may be removed laterally from the bottom plate of the mold without the necessity of lifting the same an appreciable distance above the bottom plate, thus facilitating the removal of the molded forms from the mold. This is conveniently effected by hinging said wall at its lower margin, as upon pintle-pins 16, to the frame, so that it may swing downwardly and outwardly. The swinging side wall 13 is strengthened by a flange 13$^a$, which may conveniently constitute a handle by which the wall is manipulated. The top or cover 14 is hinged by lugs 17 to a transverse horizontal pintle-rod 18, mounted in lugs 19, rising from the frame. Said cover rests, when thrown upwardly, against standards 20, that extend upwardly from the machine-frame. The cover is provided with a handle 21, by which it may be raised and lowered. The swinging side wall 13 is held in its upright or closed position by means of swinging lock bars or links 22, that are hinged at their rear ends to the reduced outer ends of the pintle-rod 18 and are notched near their free ends to engage locking-lugs 23, fixed to the front wall. The said locking links or bars 22 are swung upwardly and rearwardly to release the swinging side wall, and when in their rearmost positions are supported by pins or lugs 24, which extend laterally from the standards 20.
25 25 designate the partition-plates referred to, which are horizontal and are disposed vertically edgewise. They slide across the mold-bed or pallet in the mold and form, together with the walls of the mold and the mold-bed, when in their forward positions, upwardly-opening mold-spaces to receive the plastic material which is given form in said spaces. Said partition-plates slide horizontally through slots 26 in the fixed side wall 12 of the mold, across the mold-bed or pallet, and toward and from the movable side wall 13. When the plates have been moved inwardly, the mold-spaces formed between the same are filled with the plastic material which is tamped therein, and the top wall or cover is thereafter closed upon the upper surfaces of the molded forms in said mold-spaces to smooth the same. After the molded forms are set the partition-plates are withdrawn from the mold, and thereafter the top and side walls are swung to their open positions, and the pallet, with the set molded forms thereon, is removed laterally from the mold. The said partition-plates are supported at their rear ends in guide-slots 27, alined with the slots of the fixed wall 12 and formed in a horizontal bar 27ª, that extends from end to end of the machine. Said bar 27ª is herein shown as made integral with two short transverse members 28 28, one at each end of the machine. Said transverse members 28 are provided at their inner or forward ends with flanges 29, which are herein shown as bolted to the stationary wall 12 of the mold, and the bar 27ª is itself bolted to a horizontal bar 30, rising from the frame 10.

Any suitable means may be employed for sliding said partition-plates inwardly across the mold-bed to form the mold-spaces referred to and outwardly to clear the bed. The construction shown in Figs. 1 to 6, inclusive, embraces a rack-and-pinion mechanism and is made as follows: 32 designates a rotary shaft extending through and having rotative bearing in apertures in said partition-plates 25 and carried thereby. Said shaft is provided at its ends with pinions 33, that engage with the teeth of downwardly-facing racks 34, formed on the lower margins of the transverse frame members 28 at the ends of the machine. Said shaft 32 may be operated from either end of the machine by means of suitable hand levers or cranks 35, fixed to the shaft outside of said pinions 33.

It is desirable in some instances to form the brick or blocks with one or more specially-finished faces. This is effected by means of suitable facing-plates 36, which may be attached to one or more of the movable walls of the mold and are pressed against the plastic material to impart a finish thereto, depending upon the character of the facing-plates. In the present construction I have illustrated one set of said facing-plates applied to the under side of the cover or top wall 14 and designed to finish the top edge faces of the brick or blocks, as best shown in Figs. 3 and 4. Said plates, as herein shown, are separated by spaces 37 and fit into the open sides of the mold-spaces formed between the partition-plates, and the upper margins of the partition-plates slidingly fit within the spaces 37, whereby the plates are held from lateral displacement. The movable side wall may likewise be provided with facing-plates to finish the end faces of the brick or blocks. Said facing or finishing plates are made smooth when it is desired to mold the brick or like articles with smooth faces and are made rough and of any desired surface configuration when it is desired to produce brick or like articles with a roughened surface. They may be detachably fixed to the walls carrying the same, as by means of bolts 38, or the movable walls themselves may be detachably mounted on the mold, whereby one set of plates may be removed and another substituted therefor. In some instances the specially-finished face of the brick may be formed by a special facing-coat containing a greater proportion of cement than the body of the brick. Such facing coat or material may be made of any color desired.

The removable pallet-board 15, which in this instance constitutes the mold-bed, is preferably made of a light material in order to render the same sufficiently light to be conveniently portable, wood being a suitable material. Said pallet-board may also be provided on its upper surface with facing-plates 39, as best shown in Fig. 4, so as to suitably finish the bottom edge faces of the brick or like article being formed and at the same time prevent the pallet-board from warping. The lower margins of the partition-plates slide in the spaces between said plates 39, thus lending additional insurance against lateral displacement of the partition-plates.
The advance ends of the partition-plates are shown as provided with lugs 40, Fig. 2, which enter suitably-located sockets formed in the inner face of the movable side wall to hold the ends of the plates from lateral displacement.

The construction shown in Figs. 5 and 6 is essentially similar to the construction shown in the previous figures with the exception that two molds 45 46 are located side by side on the supporting-frame 10 and a single set of plates (or two sets of plates operated by an actuating device common to both) coöperate with said molds to partition the mold-chambers into the proper size mold-spaces. As herein shown, the two sets of partition-plates are formed by the opposite ends of a single set of parallel horizontal plates 47, disposed vertically edgewise and extending across the space between the molds. The adjacent ends of the plates of said set constitute the partition-plates for one mold, and the other ends thereof constitute the partition-plates for the other mold. The plates are so operated that when one set is inserted into its mold, across the mold-bed thereof, the other set is withdrawn from its mold to clear the associated mold-bed, and vice versa. As before stated, a single actuating device operates both sets of partition-plates, and in the instance shown such actuating device consists of the rack-and-pinion mechanism hereinbefore described, the said parts being designated in Figs. 5 and 6 by the same reference characters as in the construction previously described. In this way the molds may be charged and discharged in alternation, thus greatly increasing the capacity of the machine without correspondingly increasing its cost or the space occupied by the machine. Two swinging covers or top walls 14 are provided, and two stop or supporting pins 24 are provided on the standards 20 for holding in their rearmost positions the locking bars or links 22. In other respects the construction and operation of the last-described form of machine is like that of the machine previously described.

Changes may be made in the structural details described without departing from the spirit of the invention, and such described details are not intended as limitations, except in the claims, in which the details are specified.

I claim as my invention—

1. A molding-machine comprising a mold embracing a mold-bed, side walls, one of which is slotted and the other of which is movably mounted to be lowered below the mold-bed, partition-plates sliding through the slots of the slotted wall, across the bed and toward and from the movable wall, and a cover or top wall hinged to swing upwardly away from the movable wall.

2. A molding-machine comprising a mold embracing a mold-bed, side walls, one of which is slotted and the other of which is movably mounted to be lowered below the mold-bed, partition-plates sliding through the slots of the slotted wall, across the bed and toward and from the movable wall, a cover or top wall hinged to swing upwardly away from the movable wall, and a support against which the top wall or cover rests when in its open position.

3. A molding-machine comprising a mold having a mold-bed, side walls, one of which is movably mounted so as to be lowered below the level of the mold-bed, and the other of which is slotted, and partition-plates slidable through the slots of the latter wall, across the bed and toward and from the movable wall, and ratchet-pinion mechanism for operating the partition-plates.

4. A molding-machine comprising a mold having a mold-bed, side walls, one of which is movably mounted so as to be lowered below the level of the mold-bed, and the other of which is slotted, and partition-plates slidable through the slots of the latter wall, across the bed and toward and from the movable wall, a shaft movable with said partition-plates and provided with a pinion, and a fixed rack engaged by said pinion and coacting therewith to move the partition-plates endwise when the shaft is rotated.

5. A molding-machine comprising two molds, two sets of partition-plates movable into and out of the molds, and a single actuating device for operating both sets of partition-plates.

6. A molding-machine comprising two molds located side by side, two sets of sliding partition-plates movable into and out of the molds, the partition-plates of said two sets comprising the opposite ends of rigid plates that extend between the molds, and a single actuating device between the molds for operating both sets of plates.

7. A molding-machine comprising two molds, partition-plates movable into and out of the molds, and a single actuating device for operating both sets of partition-plates, constructed to withdraw one set of partition-plates from its mold while inserting the other set of plates in its mold.

8. A molding-machine comprising a mold embracing a mold-bed, side walls, one of which is slotted and the other of which is mounted so as to be lowered below the level of the mold-bed, partition-plates sliding through the slots of the slotted wall, across the mold-bed and toward and from the movable wall, and lugs on the advance ends of said plates adapted to enter registering sockets in said movable wall.

9. A molding-machine comprising a mold embracing a mold-bed, side walls, one of which is slotted and the other of which is mounted to be lowered below the level of the mold-bed, a hinged top wall, partition-plates sliding through the slots of the slotted wall, across the bed and toward and from the movable wall, and finishing-plates attached to the under face of the top wall and separated to enter the mold-spaces formed between the partition-plates.

In testimony that I claim the foregoing as my invention I affix my signature, in the presence of two witnesses, this 1st day of January, A. D. 1906.

GEORGE BROWN.

Witnesses:
CHARLES M. KRIEGHBAUM,
F. HOWARD.